US011530637B2

(12) United States Patent
Kashiwase et al.

(10) Patent No.: US 11,530,637 B2
(45) Date of Patent: Dec. 20, 2022

(54) WORK VEHICLE

(71) Applicant: Kubota Corporation, Osaka (JP)

(72) Inventors: Koji Kashiwase, Sakai (JP); Kenji Terabaru, Sakai (JP)

(73) Assignee: Kubota Corporation, Osaka (JP)

(*) Notice: Subject to any disclaimer, the term of this patent is extended or adjusted under 35 U.S.C. 154(b) by 19 days.

(21) Appl. No.: 17/337,822

(22) Filed: Jun. 3, 2021

(65) Prior Publication Data
US 2022/0099013 A1 Mar. 31, 2022

(30) Foreign Application Priority Data
Sep. 28, 2020 (JP) .............................. JP2020-162271

(51) Int. Cl.
 *F01N 13/18* (2010.01)
 *F01N 3/021* (2006.01)
 *F01N 3/24* (2006.01)

(52) U.S. Cl.
 CPC ........ *F01N 13/1822* (2013.01); *F01N 3/0211* (2013.01); *F01N 3/24* (2013.01); *F01N 13/18* (2013.01); *F01N 13/1805* (2013.01)

(58) Field of Classification Search
 CPC .. F01N 13/18; F01N 13/1805; F01N 13/1822; F01N 3/0211; F01N 3/24
 See application file for complete search history.

(56) References Cited

U.S. PATENT DOCUMENTS

| | | | | |
|---|---|---|---|---|
| 2014/0196973 A1* | 7/2014 | Sellars | ................... | F01N 13/00 181/212 |
| 2016/0096426 A1* | 4/2016 | Kurokawa | .............. | F01N 3/021 180/309 |
| 2017/0001508 A1* | 1/2017 | Bessho | ...................... | F16H 9/12 |
| 2018/0154765 A1* | 6/2018 | Oyama | ............... | F01N 13/1822 |
| 2020/0003109 A1* | 1/2020 | Aratake | ................. | B60K 13/04 |

FOREIGN PATENT DOCUMENTS

JP            202051424 A      4/2020

* cited by examiner

*Primary Examiner* — Anthony Ayala Delgado
(74) *Attorney, Agent, or Firm* — The Webb Law Firm (57) ABSTRACT

An attachment device includes a support table member and a coupling mechanism. The coupling mechanism includes a coupling bolt and an abutment member having a nut portion. In the abutment member, there is formed a locking protrusion protruding to the side where an auxiliary machine fixing portion is present. In the auxiliary machine fixing portion, there is formed an insertion hole for the coupling bolt and an anti-rotation hole in which the locking protrusion can be fitted.

5 Claims, 7 Drawing Sheets

WORK VEHICLE

CROSS-REFERENCE TO RELATED APPLICATION

This application claims priority to Japanese Patent Application No. 2020-162271 filed Sep. 28, 2020, the disclosure of which is hereby incorporated by reference in its entirety.

BACKGROUND OF THE INVENTION

1. Field of the Invention

The present invention relates to a work vehicle including an attachment device for attaching an engine auxiliary machine to an auxiliary machine fixing portion formed integrally with (or inseparably from) a engine section.

2. Description of the Related Art

An example of a work vehicle of the above-noted type is known from Japanese Unexamined Patent Application No. 2020-51424 document. In this work vehicle according to the conventional art, at a position upwardly of a engine section are disposed inside an engine room, an exhaust gas treatment device as an engine auxiliary machine is supported via an attachment device. The attachment device is configured to bolt-couple a support table member to the auxiliary machine fixing portion formed integrally with the engine section. When the support table member is to be bolt-coupled to the auxiliary machine fixing portion formed integrally with the engine section, firstly, a coupling bolt will be threaded and temporarily fastened with a nut which is disposed on the side opposite the support table member across the auxiliary machine fixing portion. And, this temporary fastening operation is effected by a manual operation using a manual operation tool for example. Under this temporarily fastened state, a separate operation will be effected in such a manner as effecting attachment of the exhaust gas treatment device mounted to the attachment device while adjusting a connection state of an exhaust manifold or an exhaust pipe etc. to be connected subsequently. Thereafter, a final fastening operation of the coupling bolt is effected with using a power tool such as an impact driver. In this, if e.g. the temporarily fastened state is too loose because the temporary fastening operation has not been done properly or has hardly been done, the fastening operation per use using the power tool may not be possible due to idle rotation (or racing) of the nut. Conversely, if the temporary fastening has been done too tightly, there may occur an error or distortion of bonded position at a connecting position between the exhaust gas treatment device and a machine disposed before/after it or connection failure which invites e.g. deformation of a gasket. In this respect, there remains room for improvement. The present invention provides a work vehicle that allows easy checking of whether a preliminary temporary fastening operation has been done properly or not when a support table member of an attachment device is to be bolt-coupled at the time of attachment of an engine auxiliary machine to the auxiliary machine fixing portion.

SUMMARY OF THE INVENTION

As a solution proposed for accomplishing the above-noted object, a work vehicle according to the present invention comprises:

an auxiliary machine fixing portion formed integrally with an engine section and capable of attaching an engine auxiliary machine;

an attachment device for attaching the engine auxiliary machine to the auxiliary machine fixing portion;

a support table member included in the attachment device and configured to attach the engine auxiliary machine to the auxiliary machine fixing portion under a predetermined posture;

a coupling mechanism included in the attachment device and configured to fixedly couple the support table member to the auxiliary machine fixing portion;

a coupling bolt included in the coupling mechanism and provided to extend through the support table member and the auxiliary machine fixing portion; and an abutment member included in the coupling mechanism to come into abutment against the auxiliary machine fixing portion on the side oppose the side abutted by the support table member across the auxiliary machine fixing portion, the abutment member having a nut portion threaded to the coupling bolt;

wherein in the abutment member, there is formed a locking protrusion protruding to the side where the auxiliary machine fixing portion is present as the target of abutment;

wherein in the auxiliary machine fixing portion, there are formed an insertion hole for the coupling bolt and an anti-rotation hole in which the locking protrusion can be fitted;

wherein the locking protrusion has its protrusion amount in the protruding direction set such that the locking protrusion is fitted in the anti-rotation hole between a state where the abutment member is at its maximally fastened position in abutment against the auxiliary machine fixing portion and a state where the abutment member is at a temporarily fastened position set to a loosening side by a predetermined amount from the maximally fastened state; and wherein the locking protrusion has the protrusion amount in the protruding direction set such that the locking protrusion is located at a position withdrawn from the anti-rotation hole when the abutment member is located at a position farther from the auxiliary machine fixing portion than the temporarily fastened position.

With the present invention, the coupling mechanism of the attachment device includes, on the side opposite the side abutted by the support table member across the auxiliary machine fixing portion, an abutment member having a nut portion threaded to the coupling bolt. In this abutment member, there is formed a locking protrusion protruding toward the side where the auxiliary machine fixing portion as the target of abutment is present. And, in the auxiliary machine fixing portion, there is formed an anti-rotation hole in which the locking protrusion can be fitted. And, the locking protrusion has its protrusion amount in the protruding direction set such that the locking protrusion is fitted in the anti-rotation hole between a state where the abutment member is at its maximally fastened position in abutment against the auxiliary machine fixing portion and a state where the abutment is at a temporarily fastened position set to a loosening side by a predetermined amount from the maximally fastened position. And, the protrusion amount in the protruding direction is set such that the locking protrusion is located at a position withdrawn from the anti-rotation hole when the abutment member is located at a position farther from the auxiliary machine fixing portion than the temporarily fastened position. Therefore, it is readily possible to check whether an appropriate temporary fastening operation has been effected or not when conducting a temporary fastening operation by threading the coupling bolt to the nut portion of the abutment member located at a position where visual confirmation is difficult. It is also readily possible to check whether the temporary fastening operation has been effected appropriately or not when a final fastening operation is to be effected. Namely, at the time of effecting a temporary fastening operation, for checking whether the temporary fastening is appropriate or not, while the temporary fastening operation of the coupling bolt is being effected with pressing a manual tool for manual operation against the head portion of the coupling bolt, the abutment member located on the side opposite the auxiliary machine fixing portion will be moved slightly in the direction perpendicular to the axis of the coupling bolt, whereby it is possible to check whether the locking protrusion has been fitted into the anti-rotation hole or not. If fitting of the locking protrusion into the anti-rotation hole has been confirmed, with this, it may be determined that the temporary fastening operation has been effected as intended. Or, also when the final fastening operation is to be effected, it is readily possible to check whether the temporary fastening operation has been effected appropriately or not. Namely, prior to execution of the final fastening operation, it is readily possible to check problems such that adjustment is found difficult due to occurrence of some error or distortion in the coupling position at the connection portions between the engine auxiliary machine and any component disposed therebefore or thereafter, there is found some connection failure inviting deformation of the gasket due to too tight temporary fastening, etc. Further, when a fastening operation by a power tool placed against the head portion of the coupling bolt is attempted when a final fastening operation is to be effected, if racing or idle rotation of the nut occurs to disable the fastening operation per se by the power tool, it may be determined that the temporary fastening operation has been effected too loosely or no temporary fastening operation has been effected at all. In this way, when a temporary fastening operation is effected or a final fastening operation is effected, it is possible to check whether the temporary fastening operation has been effected appropriately or not. Consequently, there is achieved an advantage that the possibility of occurrence of assembly error in a finished product can be minimized.

Preferably, the work vehicle having the above-described configuration further comprises:

a knob portion that can be gripped during an attachment operation, the knob portion being included in the abutment member and extended in a direction intersecting a line segment interconnecting the nut portion and the locking protrusion and to a direction away from the auxiliary machine fixing portion.

With the above-described arrangement, in the abutment member, there is provided a knob portion that can be gripped during an attachment operation, the knob portion being extended to a direction away from the auxiliary machine fixing portion. Therefore, at the time of temporary fastening, when the coupling bolt is to be fastened with pressing a manual tool for a manual operation against the head portion of the coupling bolt, it is readily possible to grip the abutment member located on the side opposite the auxiliary machine fixing portion. Thus, it is readily possible to effect e.g. a confirming operation to confirm whether the locking protrusion has been fitted into the anti-rotation hole or not. More particularly, when a temporary fastening operation of the coupling bolt is effected with pressing the manual tool against the head portion of the coupling bolt, the abutment member located on the side opposite to the auxiliary machine fixing portion which is located at a position where access by hand is difficult can be gripped relatively easily by gripping the knob portion extended in the direction away from the auxiliary machine fixing portion, whereby the temporary fastening operation of the coupling bolt can be carried out with stabilizing the posture of the abutment member by gripping of the knob portion. Therefore, in the course of the temporary fastening operation, when one tries to slightly pivot the knob portion about the axis of the coupling bolt, if the knob portion pivots without much resistance, this means that the fastened state is too loose with the locking protrusion being not yet fitted into the anti-rotation hole. Conversely, if the knob portion will not pivot at all even when one tries to pivot the knob portion by gripping it, this means that the fastened state is too tight. And, if the locking protrusion will slightly move loosely or slightly rattle within the anti-rotation hole, one can confirm this as indication of the temporary fastening being effected appropriately.

Preferably, in the work vehicle having the above-described configuration, the nut portion is provided at one side end portion of the abutment member; and the knob portion is provided at the other side end portion opposite to the side where the nut portion is provided.

With the above-described arrangement, at the time of temporary fastening operation, when the coupling bolt is to be fastened with pressing the manual tool for manual operation against the head portion of the coupling bolt, the knob portion may be pivotally operated about the nut portion side with gripping of the knob portion provided at the end portion opposite to the side where the nut portion is provided, whereby the confirming operation of the fit-in state of the locking protrusion in the anti-rotation hole can be carried out easily.

Preferably, in the work vehicle having the above-described configuration:

the locking protrusion is provided between the portion where the nut portion is provided and the portion where the knob portion is provided, the locking protrusion being closer to the knob portion.

With the above-described arrangement, since the locking protrusion is provided between the portion where the nut portion is provided and the portion where the knob portion is provided and closer to the knob portion, it is readily possible to sensorily recognize the relative position of the locking protrusion relative to the knob portion. Thus, confirming operation of the fitting-in state of the locking protrusion to the anti-rotation hole can be carried out even more easily.

Preferably, in the work vehicle having the above-described configuration:

of the knob portion, the end portion thereof away from the auxiliary machine fixing portion is tilted toward the side opposite to the protruding direction of the locking protrusion.

With the above-described arrangement, since the end portion of the knob portion is tilted toward the side opposite to the protruding direction of the locking protrusion, the knob portion can be gripped easily as it is located at a position as far as possible from the auxiliary machine fixing portion where various kinds of members are present.

DETAILED DESCRIPTION OF THE PREFERRED EMBODIMENTS

Next, an embodiment of a work vehicle relating to the present invention will be explained with reference to the accompanying drawings. Incidentally, the front/rear direction and the left/right direction in the explanation of this embodiment will be described as follows, unless explicitly indicated otherwise. Namely, the traveling direction to the forward traveling side (see the arrow F in FIGS. 1 and 3) of the work vehicle to which the invention is applied at the time of its work traveling will be described as "front", the traveling direction to the reverse traveling side (see the arrow B in FIGS. 1 and 3) will be described as "rear", the direction corresponding to the right side relative to the forwardly oriented posture in this front/rear direction (see the arrow R in FIG. 3) will be described as "right", similarly, the direction corresponding to the left side (see the arrow L in FIG. 3) will be described as "left", respectively.

[General Configuration]

Figure 1:
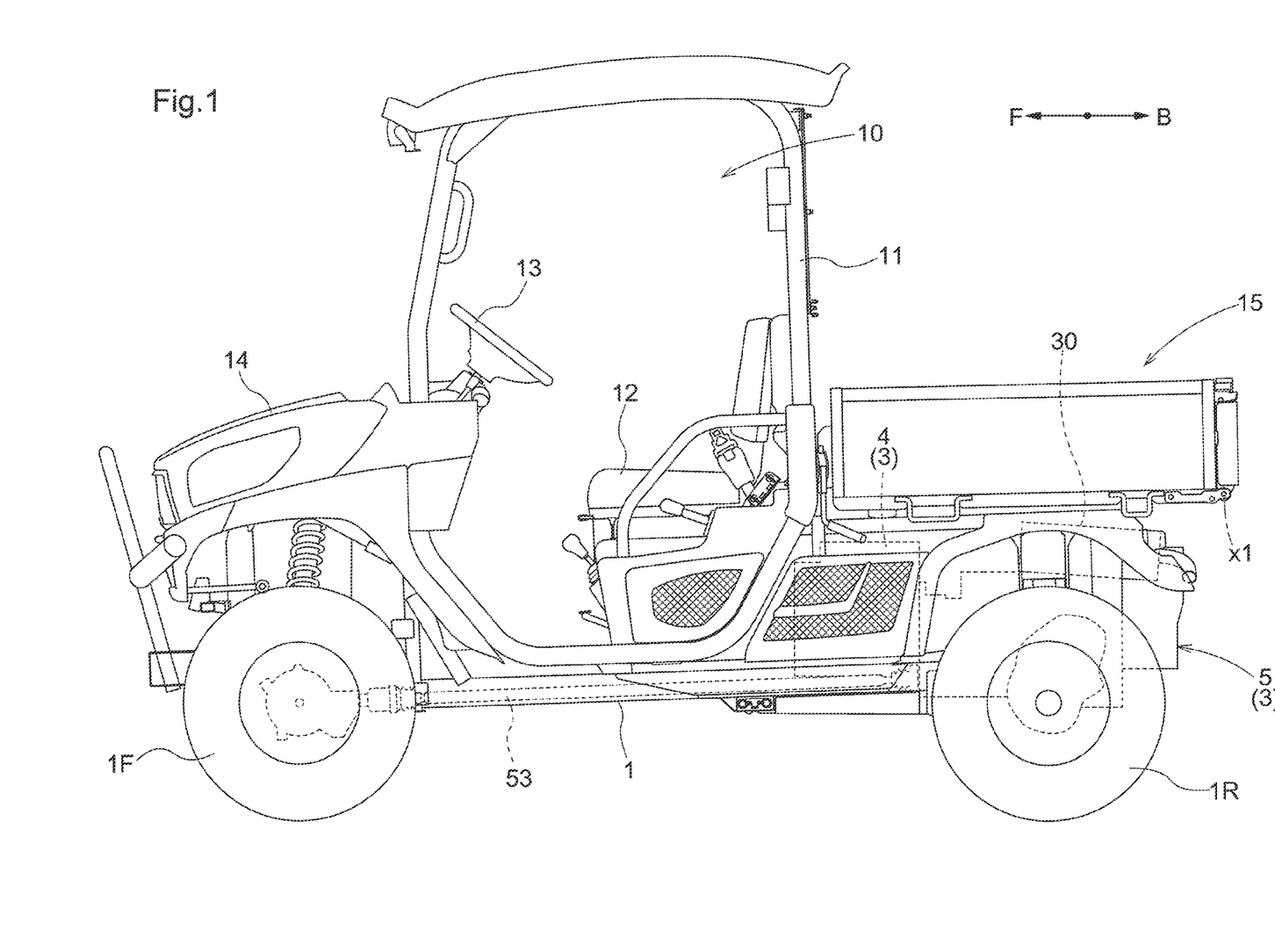
FIG. 1 is a left side view showing a utility vehicle to which the present invention is applied.
Figure 2:
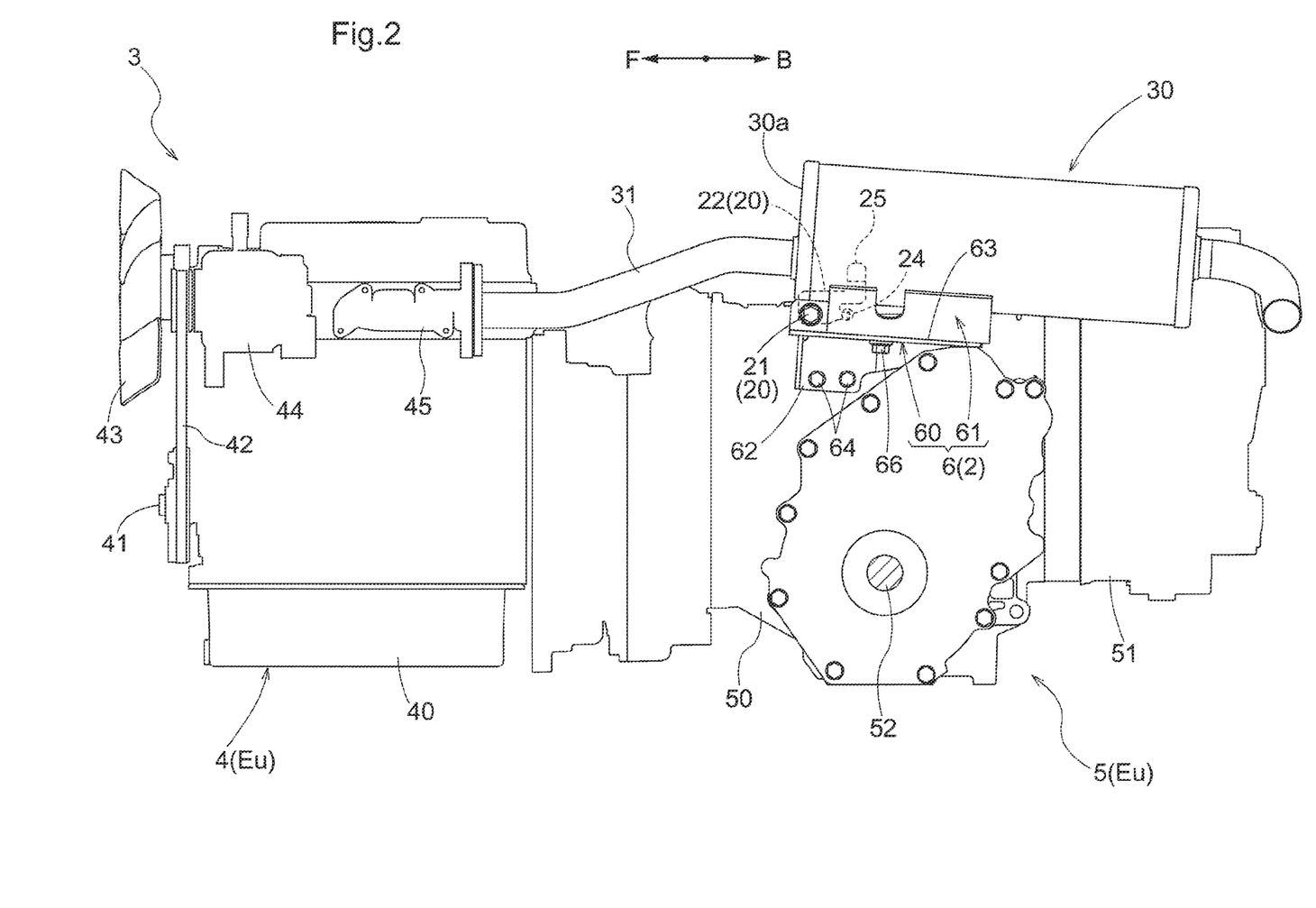
FIG. 2 is a left side view showing a use state of an attachment device in a prime mover section.

Here, there will be explained a case in which the present invention is applied to a utility vehicle as an example of the "work vehicle". As shown in FIGS. 1 and 2, the utility vehicle includes a pair of steerable left and right front wheels 1F (corresponding to "traveling device") provided at a front portion of a machine body frame 1 which forms the framework of the traveling machine body, and at a rear portion of the machine body frame 1, there are supported a pair of non-steerable left and right rear wheels 1R (corresponding to "traveling device"). At the center portion in the front/rear direction of the traveling machine body and on the upper side of the machine body frame 1, a driving section 10 is provided. At a rear portion of the traveling machine body and on the upper side of the machine body frame 1, a loading platform 15 is provided and beneath this loading platform 15, a prime mover section 3 is provided.

An arrangement is provided which allows transmission of driving power from an engine 4 included in the prime mover section 3 or from a speed changing device 5 to the front wheels 1F and the rear wheels 1R. The engine 4 is described later. With this, the utility vehicle is configured as a four-wheel drive vehicle of four-wheel drive traveling type and is used as a multiple-purpose vehicle usable for multiple of purposes such as an agricultural work, a transporting work, etc. At a position surrounding the driving section 10, there is provided a ROPS frame 11 for protecting the driving section 10.

The loading platform 15 has a function capable of discharging a load in a damping manner with its front end side lifted up about a horizontal axis (x1) in the left/right direction at a position close to its rear end, and the loading platform 15 is supported to the machine body frame 1 to be pivotable about the horizontal axis (x1). Further, there is provided a hydraulic actuator (not shown) for lifting up/down the front end side of the loading platform 15.

In the driving section 10, there are provided a driver's seat 12 at which a driver is to be seated, a steering wheel 13 for steering the front wheels 1F as well as various maneuvering operational tools. Adjacent the driver's seat 12, there is mounted a passenger's seat. In an under-seat space corresponding to the lower side of this driver's seat 12, there are disposed an oil cooler (not shown) disposed at a position to be cooled by a cooling fan 43 for a diesel engine 4, an air passage for introducing ambient air to this oil cooler, a battery device (not shown), etc. The diesel engine 4 is described later.

[Arrangement of Prime Mover Section]

Figure 3:
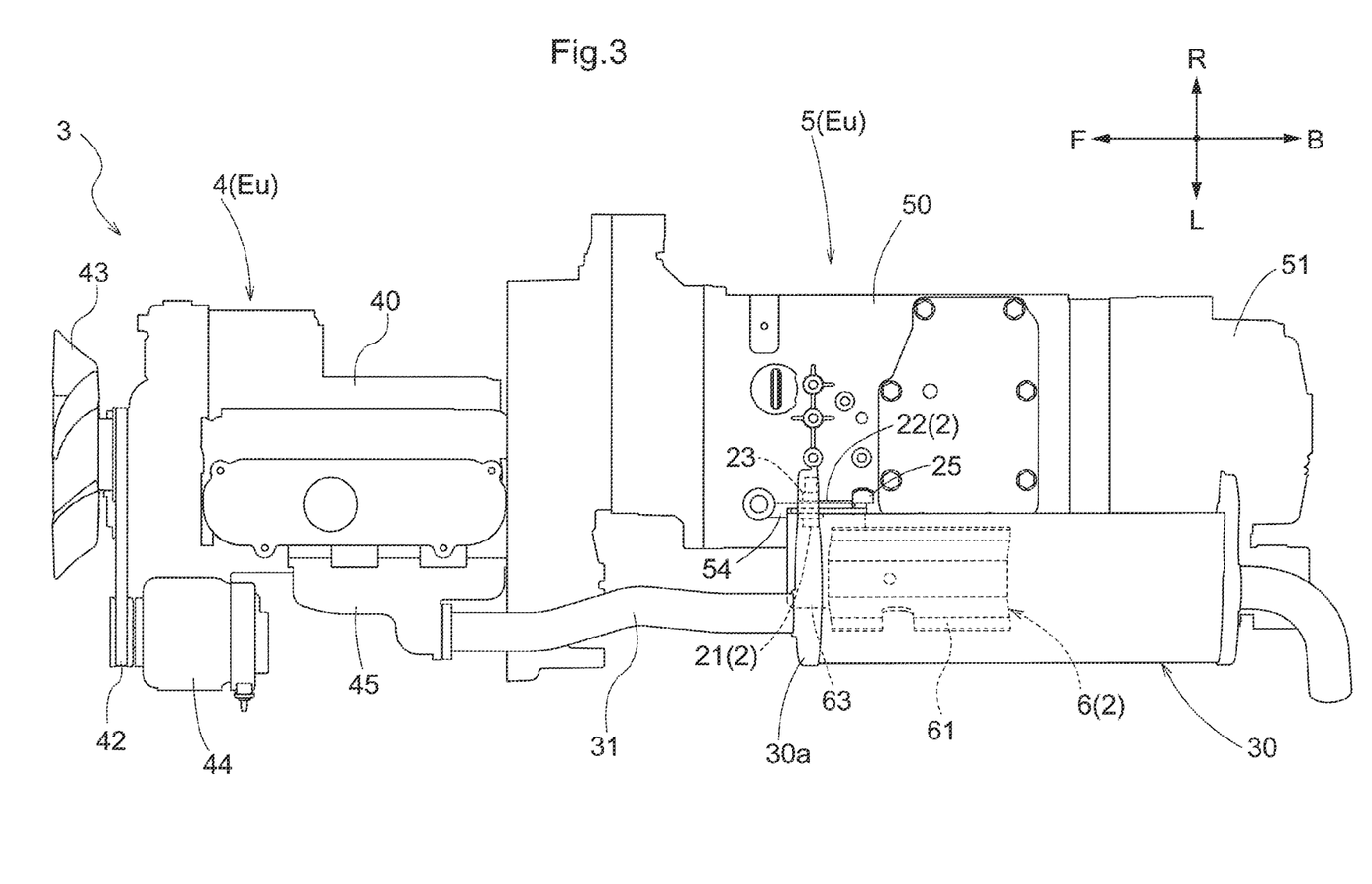
FIG. 3 is a plan view showing a use state of the attachment device in the prime mover section.
Figure 4:
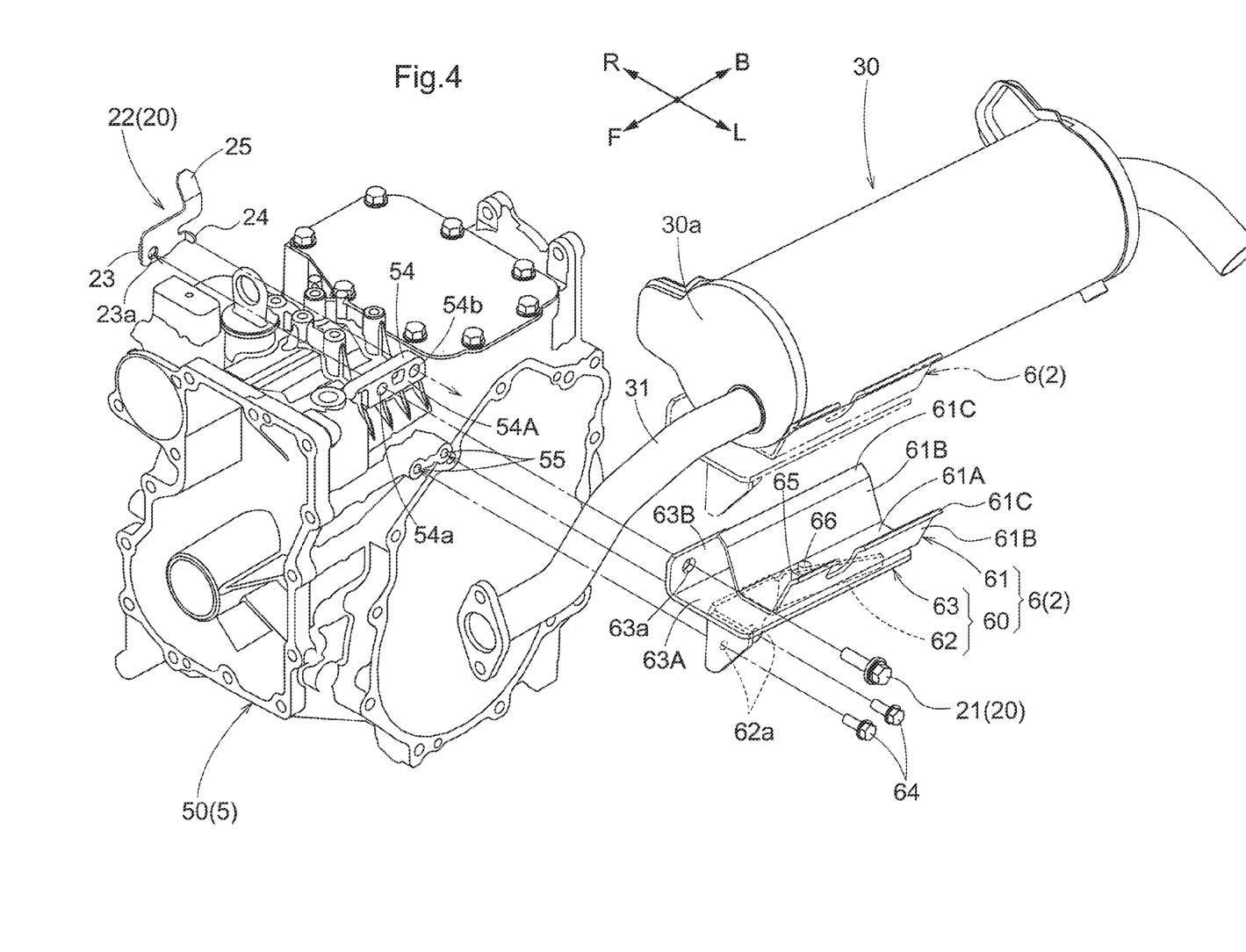
FIG. 4 is an exploded perspective view showing the attachment device in the prime mover section.

As shown in FIGS. 2 through 4, the prime mover section 3 includes the water-cooled diesel engine 4 as an internal combustion engine (to be referred to simply as the "engine", hereinafter), and the speed changing device 5 fixed to this engine 4. The speed changing device 5 is unitarily assembled with the engine 4. In this embodiment, the combination of the engine 4 and the speed changing device 5 unitarily assembled with the engine 4 will be referred to as a engine section (Eu). A radiator (not shown) for water-cooling the engine 4 is disposed inside a front hood 14 provided at a machine body front portion. The prime mover section 3 including the engine 4 and the speed changing device 5 described above is formed between the machine body frame 1 and the loading platform 15 disposed on this machine body frame and rearwardly of the driving section 10. The speed changing device 5 includes a transmission case 50 and a hydrostatic stepless speed changing device 51, transmission case 50 incorporating a gear speed changing device (not shown). The transmission case 50 is fixedly coupled rearwardly of the engine 4 and the hydrostatic stepless speed changing device 51 is fixedly coupled rearwardly of the transmission case 50.

The engine 4 includes a crank shaft (not shown) extending along the machine body front/rear direction and is configured to effect power transmission from an output shaft 41 protruding to the forward side of an engine body 40 via a fan belt 42 to the cooling fan 43 and also to an alternator 44. The cooling fan 43 is provided for introducing ambient air and sending hot air stagnating in the space upwardly of the engine 4 to the rear side and also for causing the fed ambient air to come into contact with the engine body 40 and an exhaust gas treatment device 30 (corresponding to an "engine auxiliary machine"), etc., for air-cooling these. The exhaust gas treatment device 30 is described later.

Via the output shaft (not shown) extending from a rear portion of the engine 4 to the rear side, power transmission to a traveling system and an implement system is effected. Namely, the output from the engine 4, though not shown, is speed-changed by the hydrostatic stepless speed changing device 51 as a main speed changing device included in the speed changing device 5 and further speed-changed by the gear speed changing device as an auxiliary speed changing device and then transmitted via rear axles 52 protruding to the left and right opposed sides from the transmission case 50 to the left and right rear wheels 1R, 1R. Power transmission to the front wheels 1F, 1F is effected via a transmission shaft 53 extending from a lower portion of the transmission case 50 to the front side.

[Exhaust Gas Treatment Device]

A supporting arrangement for the exhaust gas treatment device 30 will be explained next. As shown in FIGS. 2 and 3, the prime mover section 3 includes the exhaust gas treatment device 30 for cleaning exhaust gas of the engine 4. This exhaust gas treatment device 30 is constituted of using a diesel particulate filter (DPF) configured to collet and remove particulate matter contained in the exhaust gas and containing carbon as its principal component. This exhaust gas treatment device 30 is configured to effect a regeneration process for heating the collected particulate matter for combustive removal thereof, in order to prevent deterioration in its collection function due to accumulation of collected particulate matter. As a result, irrespectively of whether the rotation speed of the engine 4 is high or low, the temperature of the exhaust gas exhausted at the time of such regeneration process is higher than the temperature of exhaust gas from a conventional or standard engine.

The exhaust gas treatment device 30, as shown in FIGS. 2 through 5, is attached to an auxiliary machine fixing portion 54 included in the engine section (Eu) via an attachment device 2, the speed changing device 5 being integrated with the engine 4. The attachment device 2 is described later. The exhaust gas treatment device 30 attached to the auxiliary machine fixing portion 54 via the attachment device 2 is disposed rearwardly away from the engine 4 and at an upper portion of the transmission case 50. Under the state of being attached at this position, an exhaust gas introducing pipe 31 provided at a front end portion 30a of the exhaust gas treatment device 30 has its front end portion connected to an exhaust manifold 45 of the engine 4, as shown in FIGS. 2 and 3. This attached posture is a posture causing the longitudinal direction of the exhaust gas treatment device 30 aligned with the front/rear direction, so that the exhaust gas introducing pipe 31 too has its pipe longitudinal direction substantially aligned with the front/rear direction.

The auxiliary machine fixing portion 54 is unitarily or integrally forged with the transmission case 50, and the auxiliary machine fixing portion 54 is provided at a far-side position near the center in the left/right direction of the transmission case 50 to allow attachment with a part of the exhaust gas treatment device 30 being overlapped with the upper side of the transmission case 50 as seen in a plan view. This auxiliary machine fixing portion 54 integrally forms attachment faces 54A, 54A to which a support table member 6 and an abutment member 22, etc., of the attachment device 2 come into contact on the front and rear sides thereof, a coupling hole 54a into which a coupling bolt 21 is to be inserted, an anti-rotation hole 54b into which a locking protrusion 24 is to be inserted, etc.

[Attachment Device]

The attachment device 2 includes the support table member 6 for attaching the exhaust gas treatment device 30 as an engine auxiliary machine to the auxiliary machine fixing portion 54 under a predetermined posture and a coupling mechanism 20 for fixedly coupling the support table member 6 to the auxiliary machine fixing portion 54.

[Support Stand Member]

The support table member 6 includes an attachment body 60 which can be bolt-coupled to the auxiliary machine fixing portion 54 provided at a left upper portion of the transmission case 50, and a support body 61 detachable/attachable to/from this attachment body 60 and fixed to the exhaust gas treatment device 30.

The attachment body 60 comprises a combination of a lower plate 62 having a vertical wall portion extending along the front/rear direction as seen in the plan view, with a front end portion of the vertical wall portion being bent to protrude laterally outwards and an upper plate 63 having a flat plate portion 63A intersecting the upper end edge of the lower plate 62. And, to the upper end edge of the lower plate 62, the flat plate portion 63A of the upper plate 63 is fixedly welded. A pair of front and rear lower portion screw holes 55, 55 is defined in the left side face of the transmission case 50. And, the lower plate 62 defines a pair of front and rear first bolt insertion holes 62a, 62a into which attachment bolts 64 to be threaded to the lower portion screw holes 55, 55 can be inserted. These first bolt insertion holes 62a, 62a and the lower portion screw holes 55, 55 are defined at two portions separated from each other in the front/rear direction. In the upper plate 63, there is formed an upwardly raised piece portion 63B at the end portion of the outer circumference end portion of the flat plate portion 63A which end portion is near the left side face of the transmission case 50. This raised piece portion 63B defines, at a position higher than the lower portion screw holes 55 defined in the left side face of the transmission case 50, a second bolt insertion hole 63a for insertion of the coupling bolt 21 of the coupling mechanism 20.

Figure 5:
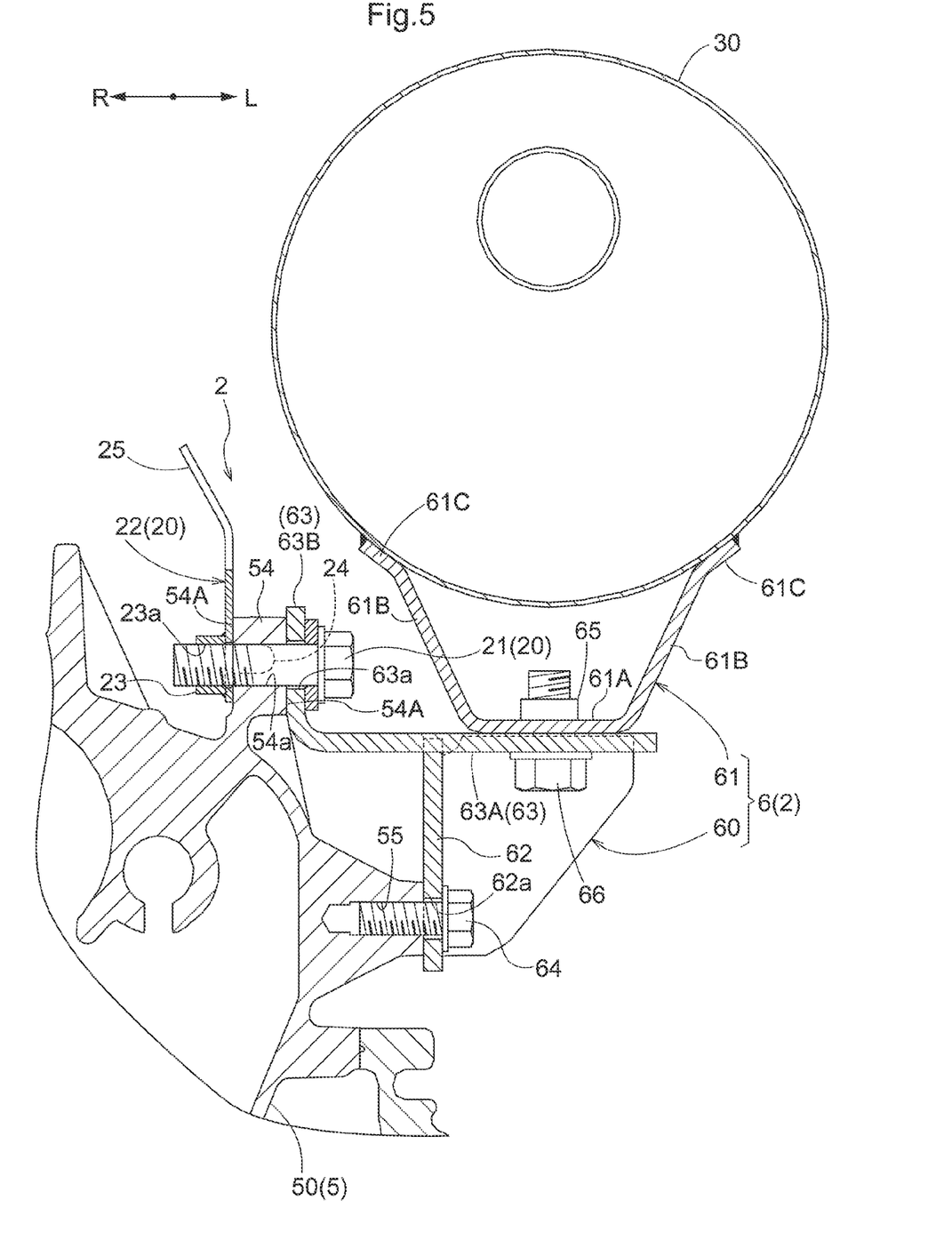
FIG. 5 is a section view showing a use state of the attachment device.

The support body 61 is formed in an approximately V-shape including a flat plate portion 61A and upwardly flared sloped plate portions 61B. The flat plate portion 61A is opposed to the flat face portion of the attachment body 60. The left/right width of the upwardly flared sloped plate portions 61B increases toward the upper side, at positions opposed to the lower half side of the cylindrical exhaust gas treatment device 30. A welding nut 65 included in the flat plate portion 61A is located at a position opposed to a coupling hole (not shown) defined in the flat face portion of the attachment body 60. The welding nut 65 is configured to allow its coupling and decoupling via a coupling bolt 66 inserted to the coupling hole from the lower side thereof. An upper end edge 61C of the upwardly flared sloped plate portions 61B of the support body 61 are fixedly welded to the lower half side of the cylindrical exhaust gas treatment device 30, as shown in FIGS. 4 and 5.

[Coupling Mechanism]

Figure 8:
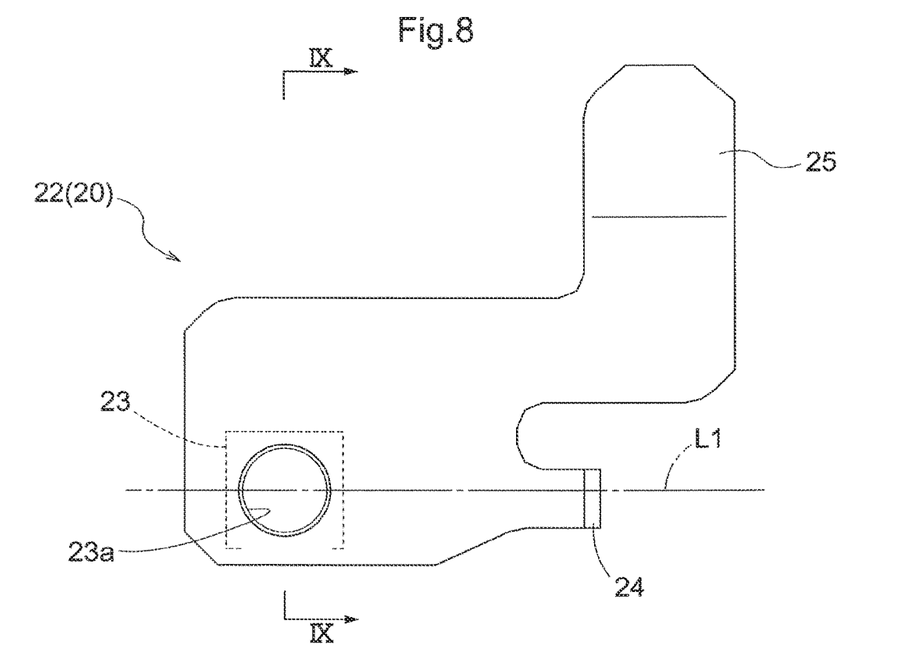
FIG. 8 is a side view showing an abutment member.
Figure 9:
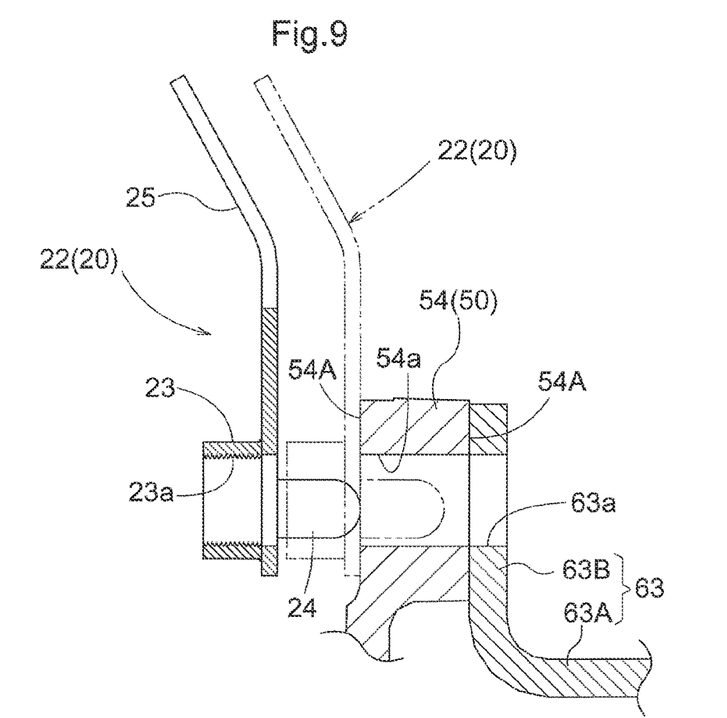
FIG. 9 is an explanatory view taken in IX-IX section in FIG. 8.

The coupling mechanism 20 includes the coupling bolt 21 and the abutment member 22. The coupling bolt 21 is inserted through the support table member 6 and the auxiliary machine fixing portion 54. The abutment member 22 abuts the attachment face 54A of the auxiliary machine fixing portion 54, on the side opposite to the attachment face 54A to which the support table member 6 abuts across the auxiliary machine fixing portion 54. As shown in FIGS. 8 and 9, the abutment member 22 integrally includes a nut portion 23 threaded to the coupling bolt 21, a locking protrusion 24 protruding to the side where the auxiliary machine fixing portion 54 is present as the target of its abutment, and a knob portion 25.

As shown in FIGS. 6 through 9, the nut portion 23 includes a female thread portion to be threaded to the male thread portion of the coupling bolt 21, in the inner circumference of the coupling hole 23a. The nut portion 23 is fixedly welded to one end portion of the plate-like abutment member 22. At the other end portion of the abutment member 22, the locking protrusion 24 is formed on the lower side thereof and the knob portion 25 is provided on the upper side thereof. In the abutment member 22, on the face thereof opposite to the face to which the nut portion 23 is fixedly welded, the locking protrusion 24 is formed to be bent to protrude toward the attachment face 54A of the auxiliary machine fixing portion 54. The knob portion 25 is extended in the direction intersecting a line segment L1 which connects the nut portion 23 with the locking protrusion 24. An upper end portion of the knob portion 25 is tilted to the side away from the attachment face 54A, reversely to the protruding direction of the locking protrusion 24.

Figure 6:
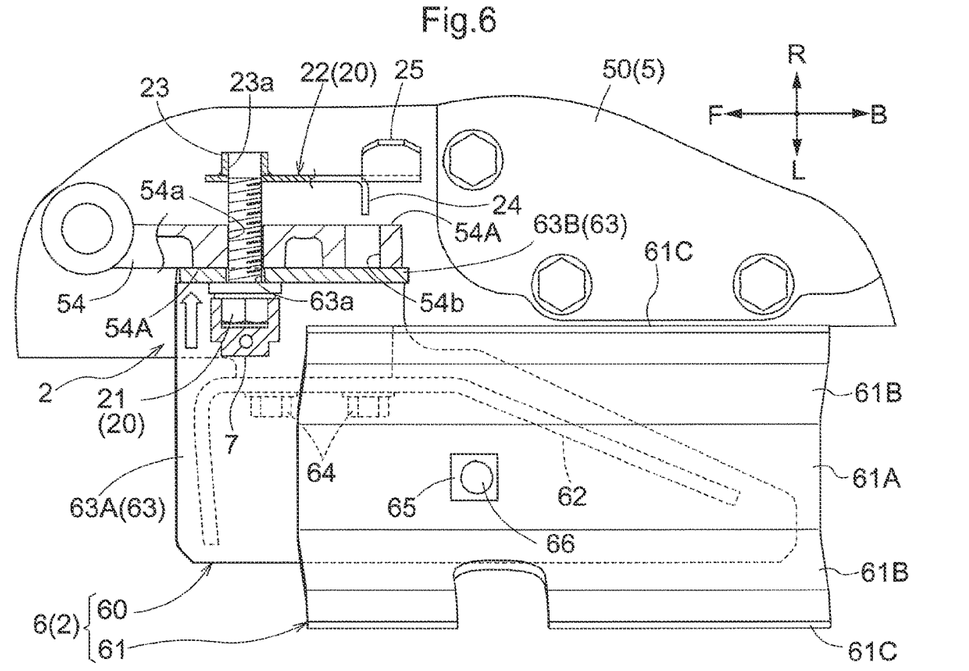
FIG. 6 is an explanatory view showing a use state of the attachment device.
Figure 7:
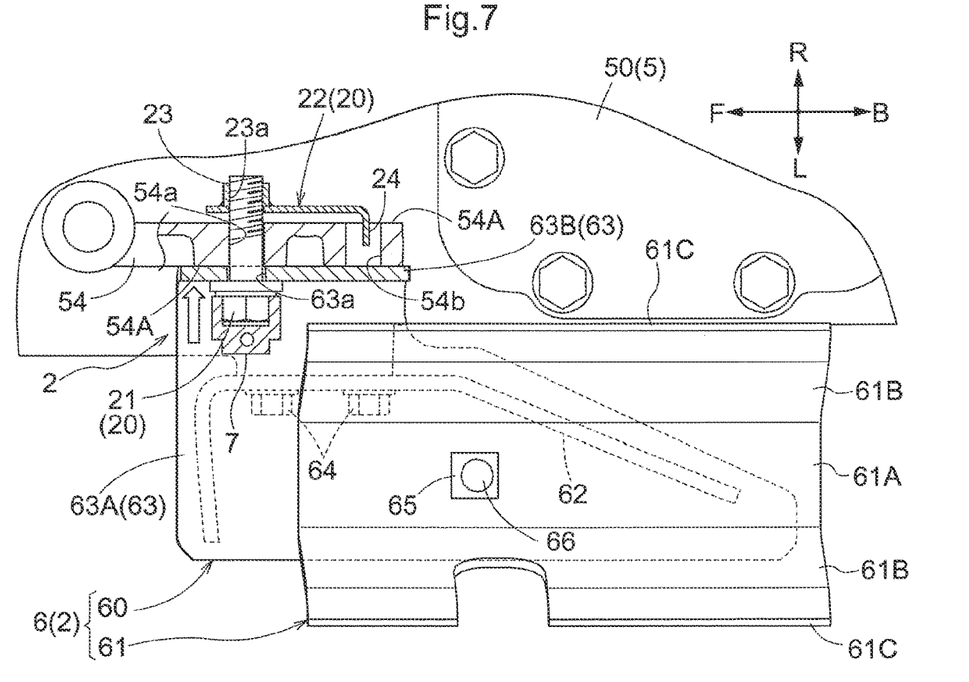
FIG. 7 is an explanatory view showing a use state of the attachment device.

As shown in FIG. 8, the locking protrusion 24 is provided between the portion where the nut portion 23 is present at the one end portion of the abutment member 22 and the portion where the knob portion 25 is provided at the oppose side end portion thereof. The locking protrusion 24 is provided at a location closer to the knob portion 25. FIG. 5 shows a state where the abutment member 22 is located at the maximally fastened state in abutment against the attachment face 54A of the auxiliary machine fixing portion 54. FIG. 7 shows a further state where the abutment member 22 is located at a temporarily fastened state which is set to the loosening side loosened by a predetermined amount from the maximally fastened state. FIG. 6 shows that the locking protrusion 24 is withdrawn from the anti-rotation hole 54b when the abutment member 22 is located at a position farther away from the attachment face 54A of the auxiliary machine fixing portion 54 than the temporarily fastened state. And, the protrusion amount of the locking protrusion 24 toward the attachment face 54A is set such that this locking protrusion 24 may engage in the anti-rotation hole 54b between the state as shown in FIG. 5 and the further state as shown in FIG. 7, and further that the locking protrusion 24 is withdrawn from the anti-rotation hole 54b as shown in FIG. 6 when the abutment member 22 is located at a position farther away from the attachment face 54A than the temporarily fastened state.

Under the state when the locking protrusion 24 is withdrawn from the anti-rotation hole 54b as indicated by solid lines in FIGS. 6 and 9, even if fastening of the coupling bolt 21 is attempted with fitting a power tool such as an impact driver as a fastening tool 7 into the head of the coupling bolt 21, the abutment member 22 will be raced together with the coupling bolt 21. With occurrence of such racing phenomenon, it is possible to know that the preliminary temporary fastening operation was not effected properly even though the abutment member 22 is located at a position which is difficult to recognize visually. On the other hand, if the locking protrusion 24 is engaged in the anti-rotation hole 54b under the temporary fastening state where the abutment member 22 is not placed in abutment against the attachment face 54A of the auxiliary machine fixing portion 54, when fastening of the coupling bolt 21 is effected with fitting the power tool such as an impact driver as the fastening tool 7 into the head of the coupling bolt 21 as shown in FIG. 7, fastening can be made to the maximally fastened position where the abutment member 22 is placed in abutment against the attachment face 54A of the auxiliary machine fixing portion 54, as indicated by the virtual lines in FIG. 9.

As shown in FIGS. 6 and 7, the knob portion 25 can be conveniently used when the abutment member 22 is shifted from the state of the locking protrusion 24 being withdrawn from the anti-rotation hole 54b to the state of the locking protrusion 24 being engaged in the anti-rotation hole 54b. Namely, even when the nut portion 23 of the abutment member 22 is located at a position difficult to be operated, by gripping the knob portion 25 with a hand from the upper side of the exhaust gas treatment device 30, it is possible to maintain the position of the abutment member 22 relative to the attachment face 54A of the auxiliary machine fixing portion 54. Under this state, a temporary fastening operation of the coupling bolt 21 can be effected with fitting a manual fastening tool as the fastening tool 7 into the head of the coupling bolt 21, to move the abutment member 22 to the appropriate temporary fastening position as shown in FIG. 7, thus being able to provide a preliminary step prior to the final fastening with a power tool.

Under the above-described state of the abutment member 22 having been moved to the temporary fastening position, the exhaust gas treatment device 30 as an engine auxiliary machine is no longer fixed completely to the auxiliary machine fixing portion 54, rather, the exhaust gas treatment device 30 is supported to an approximate attachment position with a rather large play (or looseness). Under this state, any appropriate adjustment operations such as connecting the front end portion of the exhaust gas introducing pipe 31 provided at the front end portion 30a of the exhaust gas treatment device 30 to the exhaust manifold 45 of the engine 4, coupling of the attachment body 60 to the lower portion screw holes 55, 55 of the transmission case 50 with the attachment bolts 64 may be effected. And then, with using the power tool, the final fastening operation of the coupling bolt 21 to the maximally fastened position can be effected.

Alternative Embodiment 1

In the foregoing embodiment, there was disclosed a case in which as the engine auxiliary machine, there is employed the exhaust gas treatment device 30 constituted of using a diesel particulate filter (DPF) for removing particulate matter containing carbon as a principal component thereof contained in the exhaust gas of the engine 4. However, the engine auxiliary machine is not limited thereto. For instance, a muffler or various kinds of auxiliary machines may be employed as the target of attachment. The rest of the configuration may be same as that of the foregoing embodiment.

Alternative Embodiment 2

In the foregoing embodiment, there was disclosed a case of the transmission case 50 of the speed changing device 5 being cited as an example of the engine section (Eu) including the auxiliary machine fixing portion 54. However, the engine section (Eu) is not limited thereto, but may be e.g. the hydrostatic stepless speed changing device 51 of the speed changing device 5 or the engine body 40. Namely, what is referred to as the "engine section (Eu)" in the present invention is a generic reference to the engine body 40, the transmission case 50, etc. which is formed integrally with the engine body 40. The rest of the configuration may be same as that of the foregoing embodiment.

Alternative Embodiment 3

In the foregoing embodiment, there was disclosed an arrangement in which the nut portion 23 is fixedly welded to the abutment member 22. However, the arrangement is not limited thereto. For instance, the abutment member 22 may include an anti-rotation arrangement of a recess shape type in which the nut portion 23 is fitted, thus providing the abutment member 22 and the nut portion 23 separately. The rest of the configuration may be same as that of the foregoing embodiment.

Alternative Embodiment 4

In the foregoing embodiment, there was disclosed an arrangement in which the knob portion 25 is integrally formed in the abutment member 22. However, the arrangement is not limited thereto. For instance, a knob portion 25 provided as a separate member may be coupled to the abutment member 22. The rest of the configuration may be same as that of the foregoing embodiment.

The application of the present invention is not limited to a utility vehicle. The invention may be applied also to various work vehicles such as a lawn mower, a transport vehicle or agricultural machines, etc.

The configurations disclosed in the embodiments described above (including other embodiments, the same shall apply hereinafter) can be applied in combination with the configurations disclosed in other embodiments as long as there is no contradiction. In addition, the embodiments disclosed herein are exemplary, and the embodiments of the present invention are not limited thereto, and may be modified as appropriate within the scope not departing from the purpose of the present invention.

What is claimed is:

1. A work vehicle comprising:
   an auxiliary machine fixing portion formed integrally with an engine section and capable of attaching an engine auxiliary machine;
   an attachment device for attaching the engine auxiliary machine to the auxiliary machine fixing portion;
   a support table member included in the attachment device and configured to attach the engine auxiliary machine to the auxiliary machine fixing portion under a predetermined posture;
   a coupling mechanism included in the attachment device and configured to fixedly couple the support table member to the auxiliary machine fixing portion;
   a coupling bolt included in the coupling mechanism and configured to extend through the support table member and the auxiliary machine fixing portion; and
   an abutment member included in the coupling mechanism to come into abutment against the auxiliary machine fixing portion on the side opposite the side abutted by the support table member across the auxiliary machine fixing portion, the abutment member having a nut portion threaded to the coupling bolt;
   wherein the abutment member comprises a locking protrusion protruding to the side where the auxiliary machine fixing portion is present as the target of abutment;
   wherein the auxiliary machine fixing portion comprises an insertion hole for the coupling bolt and an anti-rotation hole in which the locking protrusion can be fitted;
   wherein the locking protrusion has a protrusion amount in the protruding direction set such that the locking protrusion is fitted in the anti-rotation hole between a state where the abutment member is at a maximally fastened position in abutment against the auxiliary machine fixing portion and a state where the abutment member is at a temporarily fastened position set to a loosening side by a predetermined amount from the maximally fastened state; and
   wherein the locking protrusion has the protrusion amount in the protruding direction set such that the locking protrusion is located at a position withdrawn from the anti-rotation hole when the abutment member is located at a position farther from the auxiliary machine fixing portion than the temporarily fastened position.

2. The work vehicle of claim 1, further comprising:
   a knob portion that can be gripped during an attachment operation, the knob portion included in the abutment member and extended in a direction intersecting a line segment interconnecting the nut portion and the locking protrusion and to a direction away from the auxiliary machine fixing portion.

3. The work vehicle of claim 2, wherein:
   the nut portion is provided at one side end portion of the abutment member; and
   the knob portion is provided at the other side end portion opposite to the side where the nut portion is provided.

4. The work vehicle of claim 3, wherein the locking protrusion is provided between the portion where the nut portion is provided and the portion where the knob portion is provided, the locking protrusion being closer to the knob portion.

5. The work vehicle of claim 2, wherein of the knob portion, the end portion thereof away from the auxiliary machine fixing portion is tilted toward the side opposite to the protruding direction of the locking protrusion.

* * * * *